United States Patent [19]

Rishack

[11] Patent Number: 5,360,344
[45] Date of Patent: Nov. 1, 1994

[54] HANDS-ON LEARNING SYSTEM INCLUDING THREE-DIMENSIONAL ACTION MODEL KIT

[76] Inventor: Christopher Rishack, R.D. #3, Little Creek Rd., Evans City, Pa. 16033

[21] Appl. No.: 999,008

[22] Filed: Dec. 31, 1992

[51] Int. Cl.⁵ ............................................. G09B 23/36
[52] U.S. Cl. ..................................................... 434/295
[58] Field of Search ................ 434/86, 295, 296, 301, 434/393, 401; 446/90, 97, 356, 99

[56] References Cited

U.S. PATENT DOCUMENTS

| | | | |
|---|---|---|---|
| 1,347,993 | 7/1920 | Dawley | 434/296 |
| 1,439,641 | 12/1922 | Rommer | 434/393 X |
| 1,882,575 | 10/1932 | Hanks | 446/86 |
| 2,035,353 | 3/1936 | Torme | 446/97 X |
| 2,500,565 | 3/1950 | Phillips | 434/401 |
| 4,014,108 | 3/1977 | Hester | 434/401 |
| 4,026,041 | 5/1977 | Kennedy | 434/86 |
| 4,177,602 | 12/1979 | Choi | 446/356 X |
| 4,515,571 | 5/1985 | Kozuka et al. | 446/90 |
| 4,600,355 | 7/1986 | Johnson | 434/401 X |
| 4,650,425 | 3/1987 | McGarry | 434/401 X |
| 4,680,022 | 7/1987 | Hoshino et al. | 446/356 X |
| 5,154,615 | 10/1992 | Jaubert | 446/90 X |

FOREIGN PATENT DOCUMENTS 648025 12/1950 United Kingdom ................. 446/97

OTHER PUBLICATIONS

Western Electric's *Articulated Manikin Template* by E. J. Moulis Technical Digest No. 15, Jul. 1969.

Primary Examiner—Gene Mancene
Assistant Examiner—Jeffrey A. Smith
Attorney, Agent, or Firm—Ansel M. Schwartz

[57] ABSTRACT

The present invention is also a hands-on learning system which includes a model kit having a plurality of parts which when assembled form a three-dimensional mechanized action model. The hands-on learning system also includes means for instructing the student in mechanics with respect to the parts of the model kit, means for instructing the student in electricity with respect to the parts of the model kit and means for instructing the student on a subject which the model represents. Preferably, the hands-on learning system also comprises means for instructing the student in applied math skills relating to the parts of the model kit. Preferably, the assembled three-dimensional action model represents an animal and the means for instructing the student on a subject comprises means for instructing the student on a subject comprises means for instructing the student on biological facts related to the animal. It should be appreciated that the hands-on learning system can include an overhead projection system, a plurality of student manuals, computers and/or a video tape recorder and monitor. The present invention is also a hands-on learning method for a student. The hands-on learning method comprises the step of providing a student with a model kit having a plurality of parts which when assembled form a three-dimensional mechanized action model. Then there is the step of instructing the student in the mechanics with respect to the parts of the model kit. Next, there is the step of instructing the student in electricity with respect to the parts of the model kit. Then, there is the step of instructing the student on the facts relating to a subject that the model represents.

1 Claim, 14 Drawing Sheets

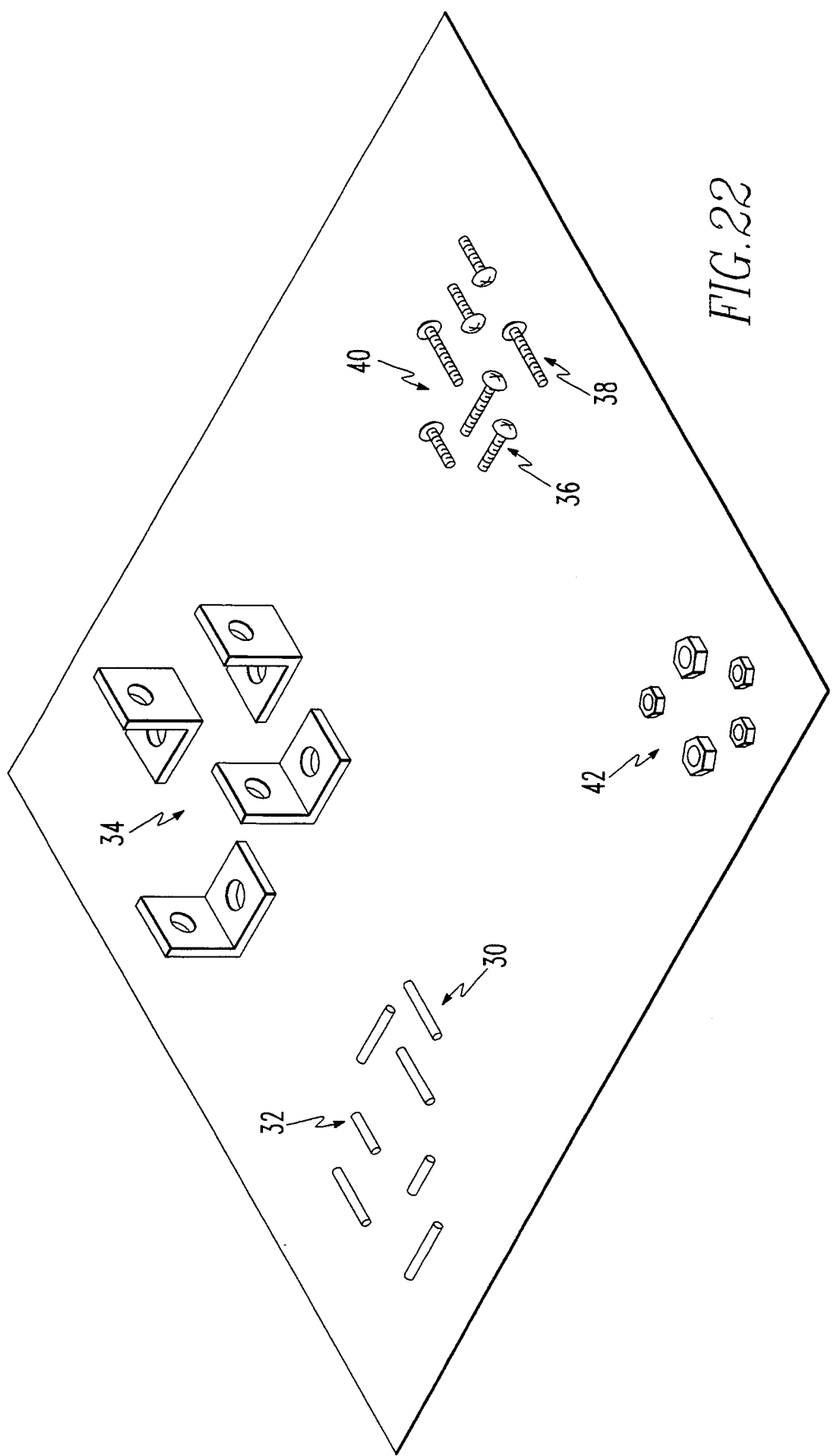

HANDS-ON LEARNING SYSTEM INCLUDING THREE-DIMENSIONAL ACTION MODEL KIT

FIELD OF THE INVENTION

The present invention is related to an action model which is constructed from a plurality of parts and a method of teaching which instructs a builder of the action model on various subjects during construction.

BACKGROUND OF THE INVENTION

It is known in the past to construct models from various parts and elements. Some models are snapped together, such as Legos ®. Other models have parts which are glued together, such as model airplanes.

The model of the present invention is unlike conventional models in that it is designed in a manner that when completed can be played with as an action model. The model of the present invention has moving parts which produce motions that enable the model to walk or move body features.

Moreover, unlike conventional models, the model of the present invention is comprised of flat molded plastic panels which are rigid, and have holes in locations required for assembly hardware. This type of system is also used by Erector ® which has panels having holes that allow you to create numerous structures using flat metal panels or panels with tabs bent to 90°. However, these holes are, by design, spaced evenly in a row or matrix. Also, Erector ® sets do not have a distinct shape to the components that make the completed project recognizable.

The model of the present invention must be assembled in a specific configuration using the hardware to attach a predetermined panel to another. Also, the model of the present invention has a definite resemblance to the subject it represents.

Unlike conventional models of animals, the model of the present invention does not represent an animal in its exact or assumed appearance but is recognizable as the figure it represents because of its contemporary appearance projected by the structural and exterior components having a minimal number of edges and angles.

Unlike many action toys, the model of the present invention is not two molded halves fastened together, rather the panels are connected parallel or at right angles to each other. The overall model of the present invention is of an open structure so that the internal workings are visible and not enclosed.

It is of particular importance that the model of the present invention can be used as a teaching tool. In contrast, a large percentage of toy manufactures have not applied their products to the field of education (unless designed specifically to do so) but, cater mainly to hobbyists and collectors. Supported by education curriculum, the model of the present invention can serve as an educational tool for learning about physics, mechanics, electricity, and about the subject the models represent. Also, through the assembly process, builders of the model can exercise their ability to read directions, orient three dimensional objects from a two dimensional drawing, and increase motor skills.

SUMMARY OF THE INVENTION

The present invention pertains to a three-dimensional action model of an animal comprising a plurality of flat rigid molded panels. The panels have distinct shapes which resemble the contour of the animal when assembled. Each of the panels have a plurality of irregularly spaced openings for assembly. The action model also comprises a plurality of hardware elements for connecting the panels at parallel or at right angles to each other such that a structural skeleton of the model is exclusively formed from the panels. The action model also comprises means for moving at least some panels of the model relative to other panels of the model.

The present invention is also a hands-on learning system for a student. The hands-on learning system comprises a model kit having a plurality of parts which when assembled form a three-dimensional mechanized action model. The hands-on learning system also comprises means for instructing the student in mechanics with respect to the parts of the model kit, means for instructing the student in electricity with respect to the parts of the model kit and means for instructing the student on a subject which the model represents. Preferably, the hands-on learning system also comprises means for instructing the student in applied math skills related to the parts of the model kit. Preferably, the assembled three-dimensional action model represents an animal and there is means for instructing the student on biological facts related to the animal.

It should be appreciated that the hands-on learning system can include an overhead projection system, a plurality of student manuals, a plurality of computers and/or a video tape recorder and monitor, to name but a few of the various teaching tools.

The present invention is also a hands-on learning method for a student. The hands-on learning method comprises the step of providing a student with a model kit having a plurality of parts which when assembled form a three-dimensional mechanized action model. Then, there is the step of instructing the student in the mechanics with respect to the parts of the model kit. Next, there is the step of instructing the student in electricity with respect to the parts of the model kit. Then, there is the step of instructing the student on the facts relating to a subject that the model represents.

BRIEF DESCRIPTION OF THE DRAWINGS

In the accompanying drawings, the preferred embodiment of the invention and preferred methods of practicing the invention are illustrated in which:

FIG. 22 is a schematic representation showing various hardware elements.

DESCRIPTION OF THE PREFERRED EMBODIMENT

Figure 1:
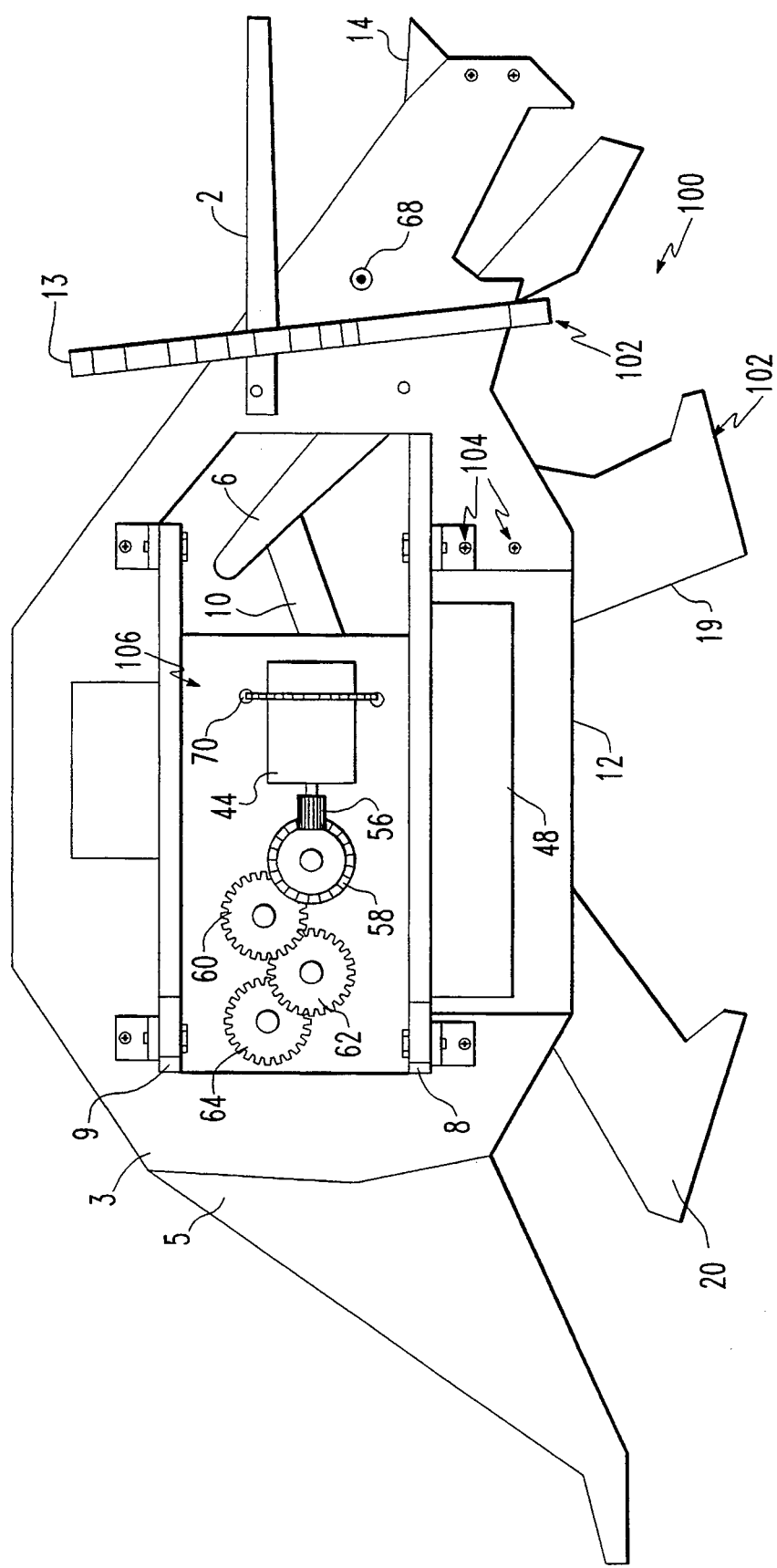
FIG. 1 is a schematic representation of a three-dimensional action model representing a Triceratops.
Figure 2:
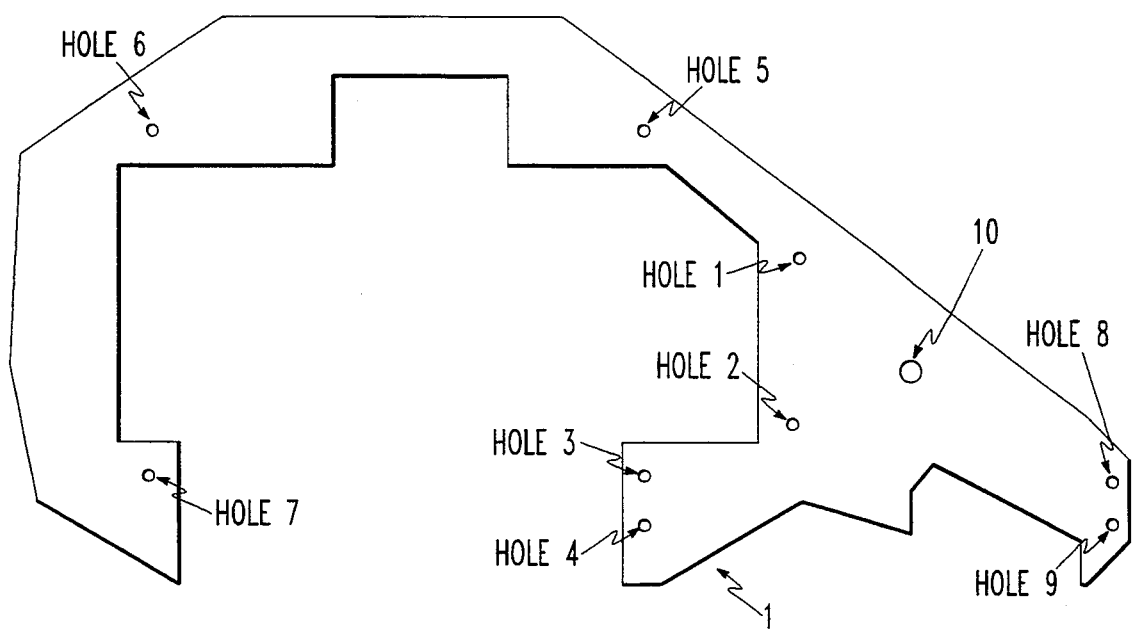
FIG. 2 is a schematic representation of the right inner panel.
Figure 8:
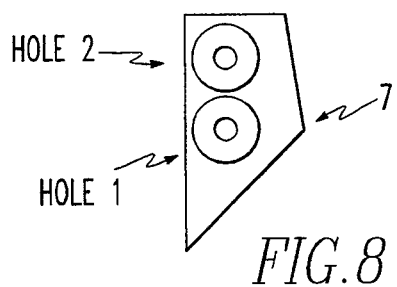
FIG. 8 is a schematic representation of the of the chest panel.
Figure 7:
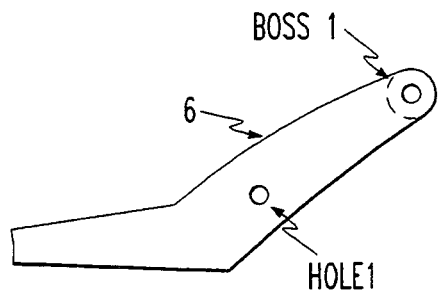
FIG. 7 is a schematic representation of the mouth panel.
Figure 15:
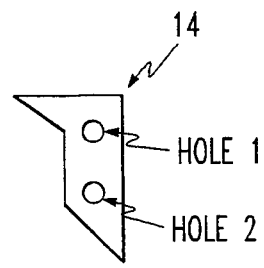
FIG. 15 is a schematic representation of the nose panel.
Figure 11:
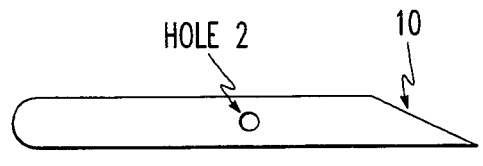
FIG. 11 is a schematic representation of the mouth pivot panel.
Figure 3:
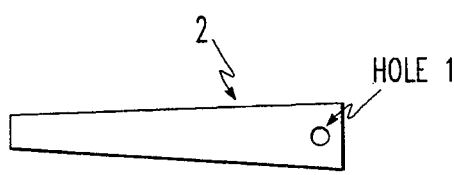
FIG. 3 is a schematic representation of the right head horn.
Figure 16:
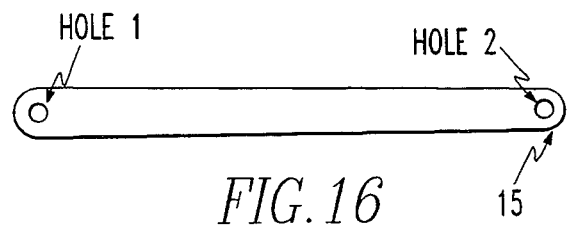
FIG. 16 is a schematic representation of the left connector panel.
Figure 5:
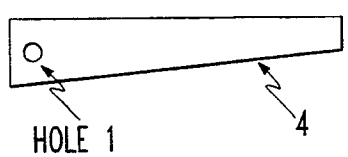
FIG. 5 is a schematic representation of the left head horn.
Figure 19:
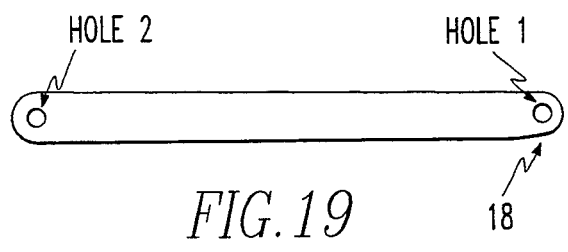
FIG. 19 is a schematic representation of the right connector panel.
Figure 4:
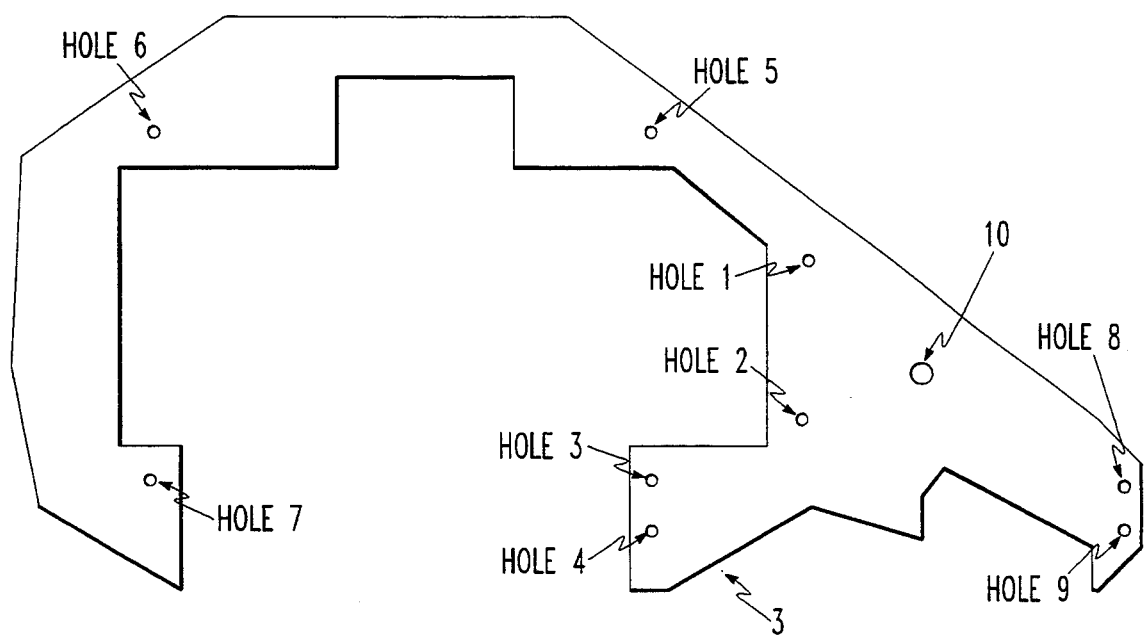
FIG. 4 is a schematic representation of the left inner panel.
Figure 6:
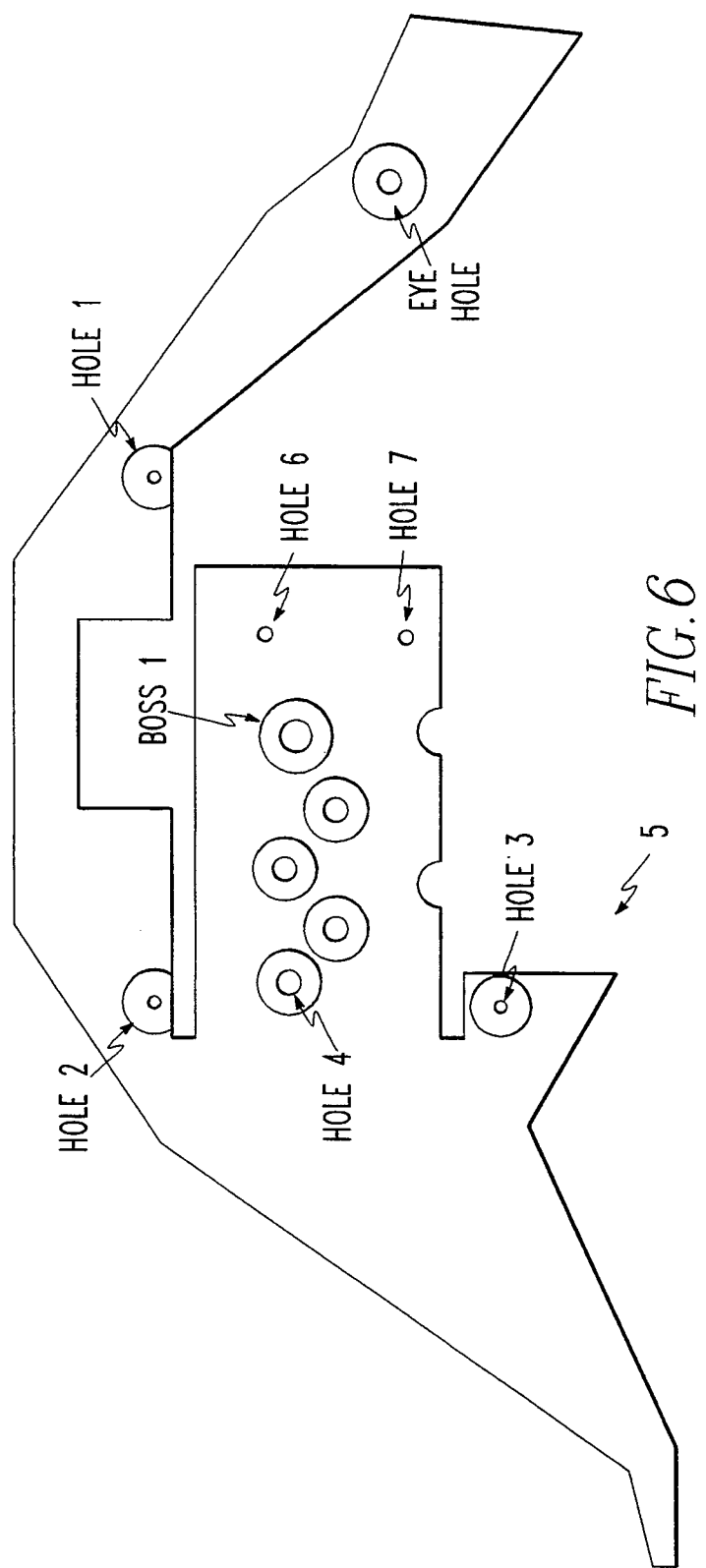
FIG. 6 is a schematic representation of the center panel.
Figure 9:
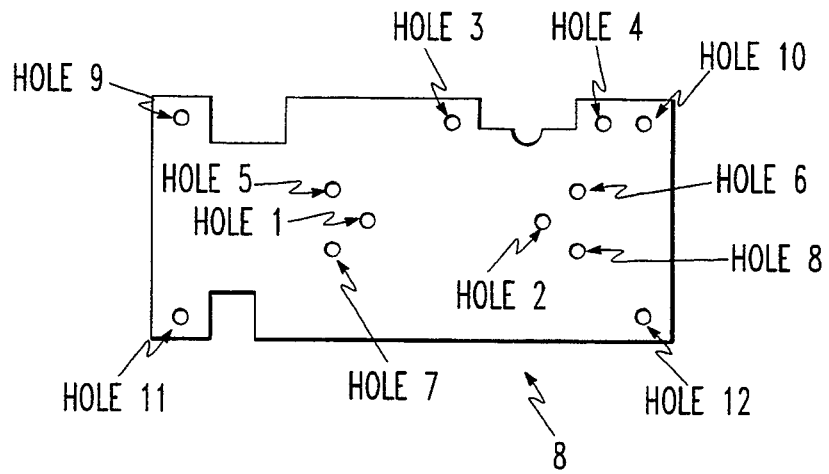
FIG. 9 is a schematic representation of the lower cross panel.
Figure 10:
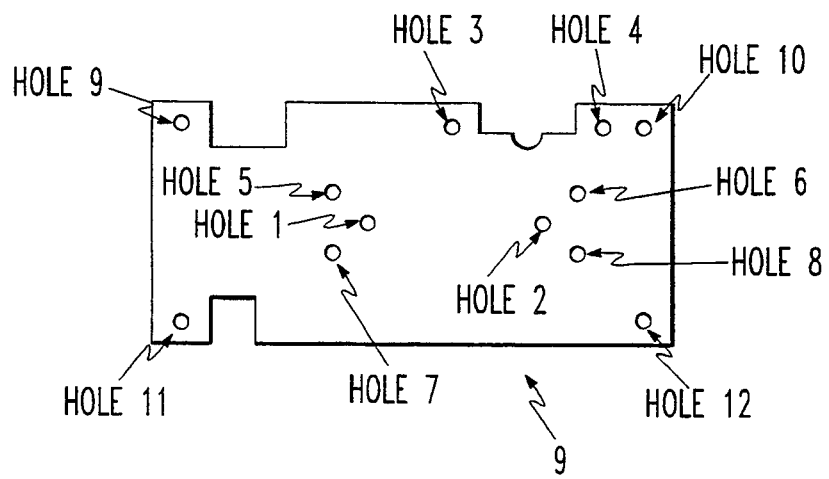
FIG. 10 is a schematic representation of the upper cross panel.
Figure 12:
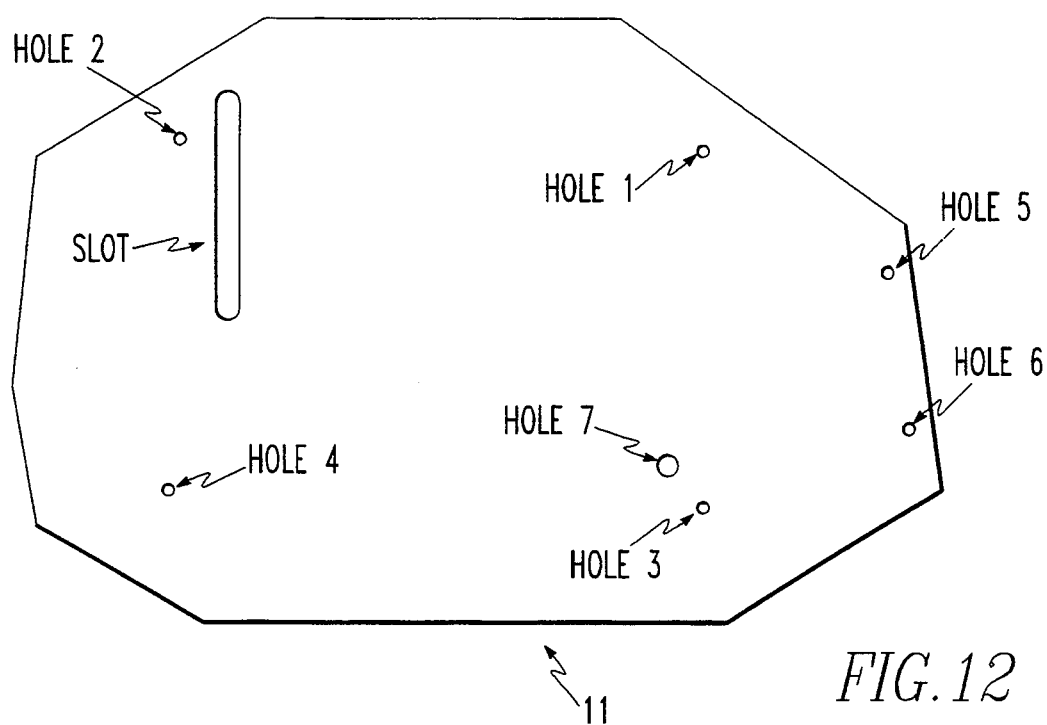
FIG. 12 is a schematic representation of the right outer panel.
Figure 13:
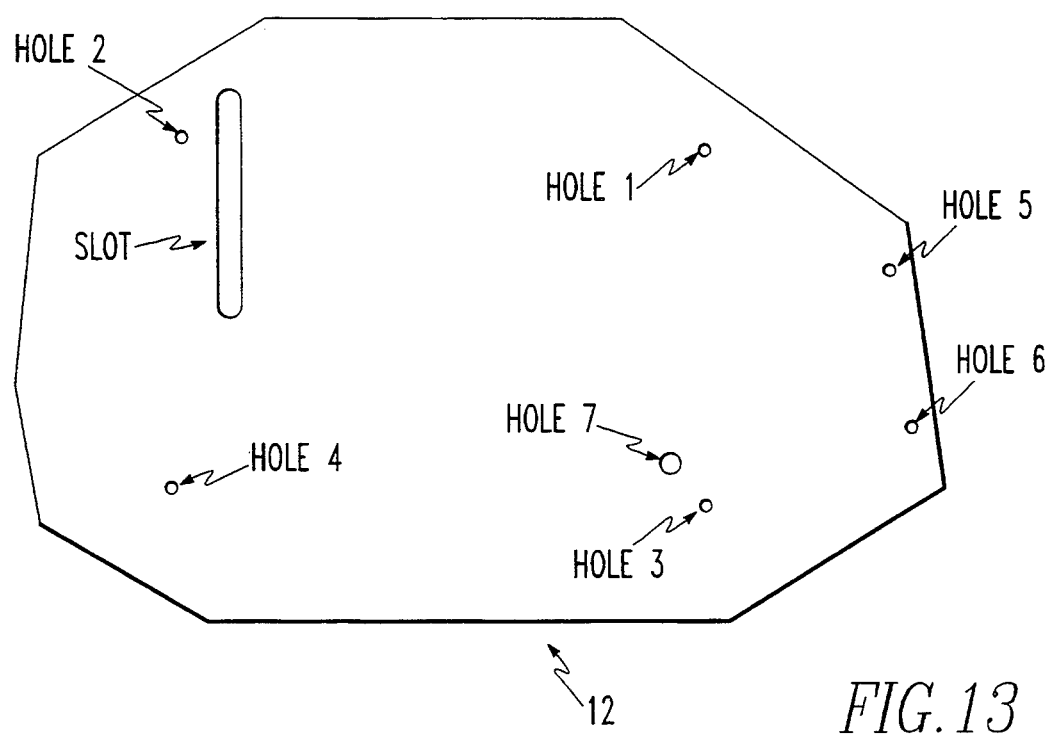
FIG. 13 is a schematic representation of the left outer panel.
Figure 14:
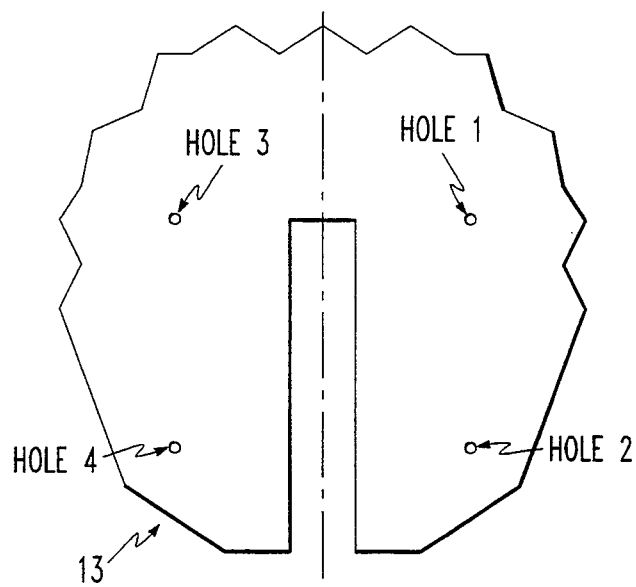
FIG. 14 is a schematic representation of the head panel.
Figure 20:
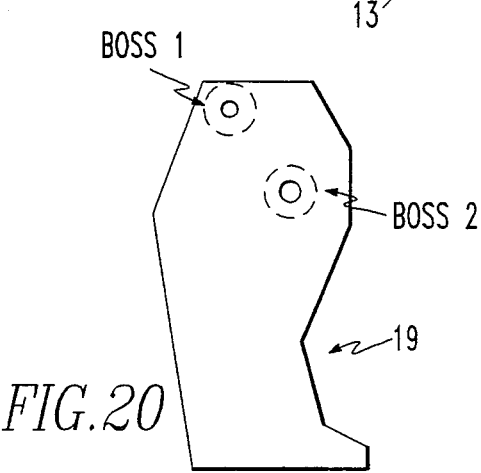
FIG. 20 is a schematic representation of the left front leg panel.
Figure 17:
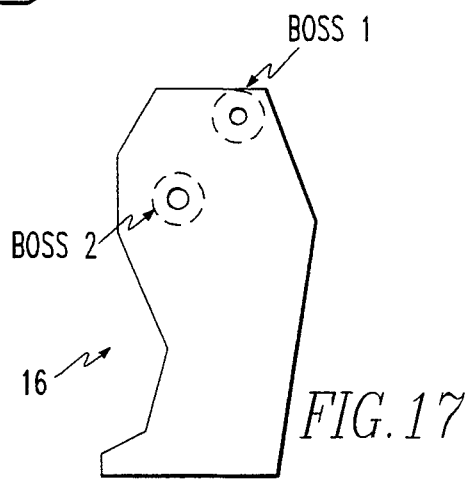
FIG. 17 is a schematic representation of the right front leg panel.
Figure 18:
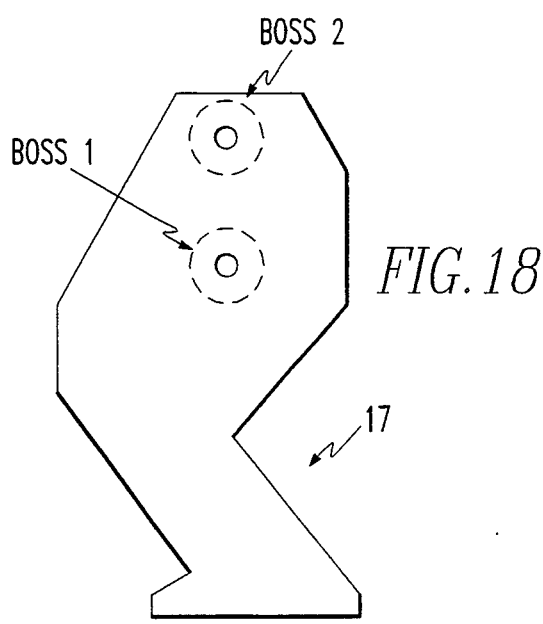
FIG. 18 is a schematic representation of the right rear leg panel.
Figure 21:
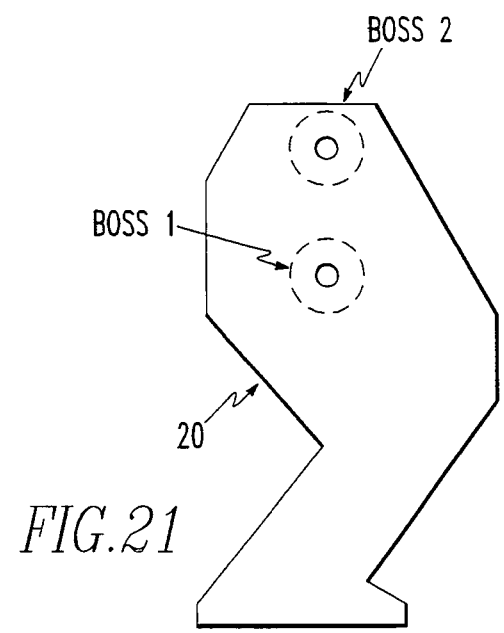
FIG. 21 is a schematic representation of the left rear leg panel.

Referring to the drawings wherein like reference numerals refer to similar or identical parts throughout the several views, and more specifically to FIG. 1 thereof, there is shown a three-dimensional action model 100 of an animal comprising a plurality of flat rigid panels 102. The panels 102 have distinct shapes which resemble the contour of the animal when assembled. Each of the panels 102 has a plurality of irregularly spaced openings for assembly. The action model 100 also comprises a plurality of hardware elements 104 for connecting the panels parallel of at right angles to each other such that a structural skeleton of the action model 100 is exclusively formed from the panels 102. The action model 100 also comprises means 106 for moving at least some panels 102 of the model 100 relative to other panels 102 of the model 100.

It should be stressed that the action model 100 is an action model and is not designed to be static once it is completed in a class or by an individual. Its application as a learning tool is enhanced by its appearance and movements, once completed, stimulate the imagination, peak the curiosity to discover how it operates, and invites builders to find out more about the real subjects that the action model 100 represents.

The action model 100 is designed to be assembled by builders of basic intuitive instruction reading skills, and motor skills. Instructions for assembly are for the most part pictorial with simple, easy to read text where needed. A single assembly step will include a brief description of the step, a list of the parts required for that step, a note to alert builder of specific part or procedure, assembly steps to follow, and a labeled picture of that step depicting the parts and placement required for assembly. Only simple hand tools are required for assembly. Each component of the action model 100 is easily identified in the instruction by a picture and brief description. Components are shaped both for appearance and function. Components which look similar are noted in the assembly instructions.

The assembly steps are ordered to provide the builder with a logical and progressive approach to building the action model 100. Each step incorporates one or more components assembled in a previous step. Many of the steps are enhanced by the optional curriculum which includes a lesson plan, a lesson, and an activity to be done with the model. A lesson may feature the models electrical or mechanical systems.

The builder will only require the pictorially based assembly instructions to build the model. A written more detailed version of the assembly instructions is available to support the assembly diagrams. A very detailed version can also be provided which explicitly describes each assembly step.

The action model 100 is comprised of a plurality of flat, high impact K-resin plastic panels 102 in which may have holes, slots, or bosses in each as required by function. Each panel 102 is shaped to perform a function in the operation and structure of the model, as well as provide a unique appearance which projects, through basic shapes of highly polished plastic (in most cases tinted and transparent), a contemporary representation of the subject the action model 100 is based on.

The remaining components may include: an electrical switch 50 and motor 44, a battery case 46, wires 52, right angles brackets 34, cams 66, shafts 54, gears 59, bolts 36, 38, 40, nuts 42, plastic eyes 68, and other retaining devices such as screws, pins or cable ties 70.

In a one embodiment, the action model represents a Triceratops dinosaur. There are 165 components needed to assemble this Triceratops model.

Twenty of the components are panels 102, 0.125 in. thick made of K-resin impact polystyrene plastic and having slots, holes of various sizes, stand offs, and bosses used for spacing or to secure a pin by friction fit. FIGS. 2–21 show each of the panels 1–20, respectively. The outer edges of each panel are molded with a radius and are shaped to represent an object, actual or fictional, with the minimum number of straight sides needed to make the panel identifiable or functional. Panels are referenced by name and number. Each name describes the panel represented or function of the panel. Each panel is numbered and refers to the sequence the panels are used in assembly. Panels which are identical may not have consecutive numbers due to the order of assembly using the panels may not be consecutive.

The following is in reference to FIGS. 2–21 which show the panels used in the model kit. There is a right inner panel 1 having ten holes 1–10. There is a right head horn panel 2 having one hole 1. There is a left inner panel 3 having ten holes 1–10. There is a left head horn panel 4 having one hole 1. There is a center panel 5 having eight holes 1–8 and one boss 1. There is a mouth panel 6 having one hole 1 and one boss 1. There is a chest panel 7 having two holes 1–2. There is a lower cross panel 8 having twelve holes 1–12. There is a upper cross panel 9 having twelve holes 1–12. There is a mouth pivot panel 10 having one hole 1. There is a right outer panel 11 having seven holes 1–11. There is a left outer panel 12 having seven holes 1–7. There is a head panel 13 having four holes 1–4. There is a nose panel 14 having two holes 1–2. There is a left connector panel 15 having two holes 1–2. There is a right front leg panel 16 having two bosses 1-2. There is a rear leg panel 17 having two bosses 1-2. There is a right connector panel 18 having two holes 1-2. There is a left front leg panel 19 having two bosses 1-2. There is a rear leg panel 20 having two bosses 1-2.

Ten of the components are steel pins which are used as shafts for panels that move to pivot on and/or as restraining devices to keep two or more panels together. Pins are friction fit into bosses on plastic panels 102 and may vary in shaft diameter, shaft length, and shape of head (if any). Pins are referred to by number 30 or 32 as denoted in parts list. There are eight pins 30 and two pins 32, each with a different head.

Twenty of the components are brackets 34 which are used to secure panels 102 to each other at right angles. Each bracket 34 has two holes, located in the center of each bracket face.

Thirty-six of the components are 2 mm bolts, 5 mm in length used with 2 mm nuts to secure two or more panels together, to secure a panel to a bracket, to secure an electromechanical component, or to secure an other object associated with the model to a panel or bracket (i.e. a wire, cable, metal, plastic, or cloth material). These bolts are referenced as bolts 36.

Two of the components are 2 mm bolts, 10 mm in length used with 2 mm nuts to secure two or more panels together, to secure a panel to a bracket, to secure an electromechanical component, or to secure an other object associated with the model to a panel or bracket (i.e. a wire, cable, metal, plastic, or cloth material). These bolts are referenced as bolts 38.

Seven of the components are 2 mm bolts, 15 mm in length used with 2 mm nuts to secure two or more panels together, to secure a panel to a bracket, to secure an electromechanical component, or to secure an other object associated with the model to a panel or bracket (i.e. a wire, cable, metal, plastic, or cloth material). These bolts are referenced as bolts 40.

Some models may incorporate bolts other than 2 mm for the same purpose as the 2 mm bolts.

Forty-five of the components are 2 mm nuts 42, used with the 2 mm bolts to secure two or more panels together, to secure a panel to a bracket, to secure an electromechanical component, to secure an other object associated with the action model 100 to a panel or bracket (i.e. a wire, cable, metal, plastic, or cloth material), or as a spacer between these objects. Some models may incorporate nuts other than 2 mm for the same purpose as the 2 mm nuts.

There is one 3 volt direct current permanent magnet, reversible, electric motor 44 is used as a source of mechanical power. There is one battery holder system consisting of one or two battery cases 46 which hold the batteries 48, the electrical power source, in place. There is one electrical switch 50 used to turn electrical power on or off, or reverse direction. This switch 50 can be a single pole single throw or double pole double throw device. Some models may have more than one switch or combination of switch types.

There is one set of electrical wires 52 required to electrically connect the motor to the switch 50, the switch 50 to the battery case 46, a battery case 46 to a battery case 46, a battery case 46 to the motor 44, or any of these objects to another electrical device (i.e. an Light Emitting Diode, light bulb, sound generator, or circuit). These devices may be wired in series, parallel, or combination of series and parallel.

There is one metal output shaft 54 with a spur gear 64 friction fit onto it so that the shaft 54 and gear 64 turn as one. There is also one set of plastic gears 59 used to reduce the speed of the output shaft 54 to a lower revolutions per minute than that of the motor 44. The set of gears 59 consists of: 1 pinion gear 56 mounted on the motors output shaft which meshes with; 1 crown gear 58 clustered with a spur gear which meshes with; a cluster spur gear 60 which meshes with; a cluster spur gear 62 which meshes with; a spur gear 64 friction fit on the output shaft. Consecutive gears will have the same tooth pitch. The number of teeth on each gear is as required to achieve the proper revolutions per minute. Other models may incorporate less or more gears, and may have more than one gear meshing with another as required to allow more than one driven gear to turn in an opposite direction as the driver at the same or different revolutions per minute. Other models may have more than one set of gears 59.

Three of the components are plastic cams 66. Each is friction fit onto the output shaft 54 so that the cams 66 and output shaft 66 turn as one: two of the cams 66 are 180° out of phase; a third cam 66 is used to operate a feature on the action model 100. A metal pin can be inserted into each cam to be utilized as an esscentric mechanical action. Other models may require more or less cams.

Finally, there are two plastic eyes 68, and one plastic cable tie 70, to secure motor 44 in place.

The present invention is also a hands-on learning system for a student. The hands-on learning system comprises a model kit having a plurality of parts which when assembled form a three-dimensional mechanized action model 100. The hands-on learning system also comprises means for instructing the student in mechanics with respect to the parts of the model kit, means for instructing the student in electricity with respect to the parts of the model kit and means for instructing the student on a subject which the model represents. Preferably, the hands-on learning system also comprises means for instructing the student in applies math skills relating to the parts of the model kit. Preferably, the assembled three-dimensional action model 100 represents an animal and the means for instructing the student on biological facts related to the animal.

Figure 26:
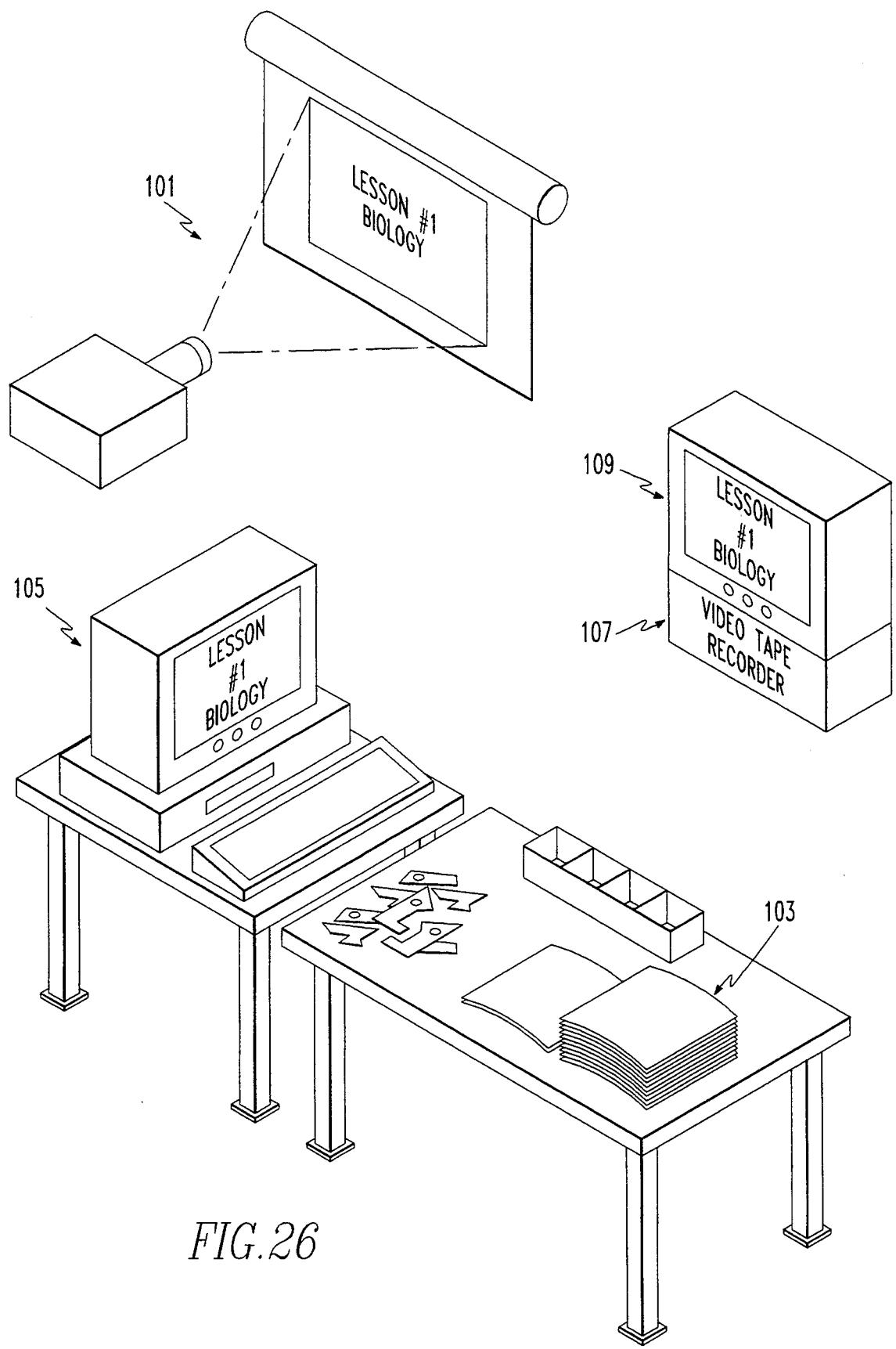
FIG. 26 is a schematic representation showing the hands-on learning system.

It should be appreciated as shown in FIG. 26, that the hands-on learning system can include an overhead projection system 101, a plurality of student manuals 103, computers 105 and/or a video tape recorder 107 and monitor 109.

The present invention is also a hands-on learning method for a student. The hands-on learning method comprises the step of providing a student with a model kit having a plurality of parts which assembled form a three-dimensional mechanized action model. Then there is the step of instructing the student in the mechanics with respect to the parts of the model kit. Next, there is the step of instructing the student in electricity with respect to the parts of the model kit. Then, there is the step of instructing the student on facts relating to a subject which the model represents.

Preferably, after the providing step, there is the step of instructing the student in applied math skills with respect to the parts of the model kit. Preferably, after the providing step, there is the step of providing an instruction manual for the model kit.

The following represents an outline of a sample lesson plan for teaching the student the various subjects during assembly of the model kit 100.

---

Lesson #1 Basic Electricity.
Voltage   Current
Resistance   Ohm's Law

Lesson #2 Electric Symbols.
Motor   Light
Resistor   Battery
Switch   Wires
Potentiometer   Transistor

Lesson #3 Simple Circuits.
Series   Parallel

Lesson #4 Motor Operation.
Magnetics   Electromagnet
Brushes   Armature
Stator

Lesson #5 Gear Reduction.
Speed Reduction   Power Transfer
Direction of Rotation

Lesson #6 Electronic Parts Identification
Motor   Battery
Switch   Light
Resistor   Potentiometer
Transistor

Lesson #7 Model Kit Operation.
Electrical   Mechanical
Overall movement and function

Lesson #8 Maintenance.
Replacing batteries
Replacing lost components

---

Figure 25A:
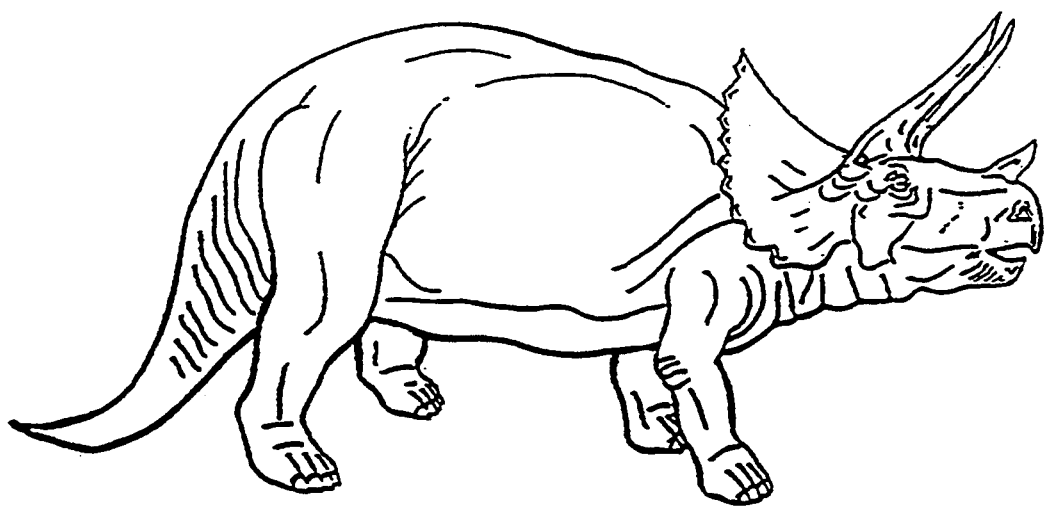
FIGS. 25a and 25b are schematic representations showing a Triceratops.
Figure 25B:
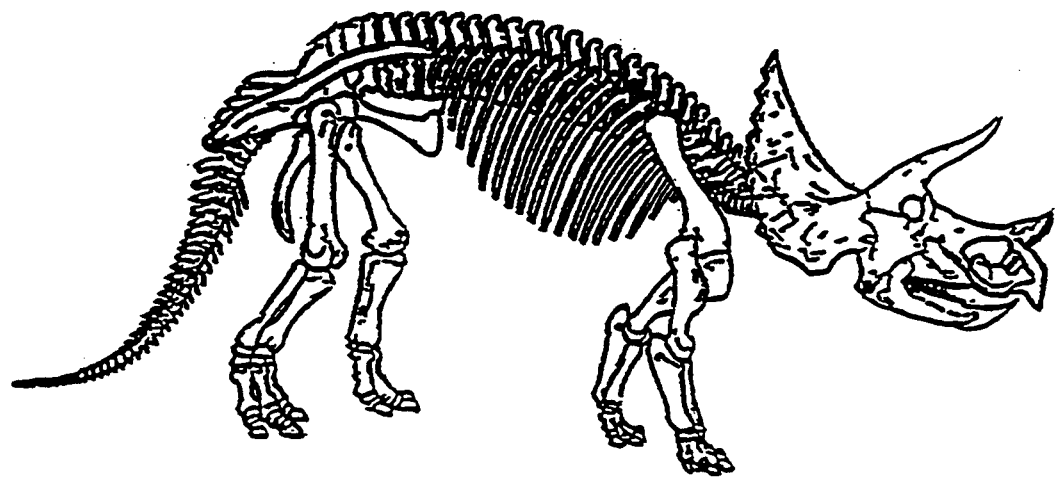

The following is an example of a sample lesson for instructing the student on biological facts related to Triceratops. The lesson can be supported by illustrations of a Triceratops as shown in FIGS. 25a and 25b.

TRICERATOPS LESSON

Triceratops ("three-horned face") is one of the best known Ceratopsians (horned dinosaurs) and one of the last of the ceratopsids to exist during the Cretaceous period.

Weighing 6 tons and reaching 30 ft. in length, one third of the entire length of the dinosaur was made up by its large head and hard bony frill. Triceratops is considered to be a short-frilled ceratops.

Both male and female Ceratopsids had horns. Horns were used to uproot small palm trees to eat and protect the young. Presumably, the males used their horns to joust. Of the three horns, the two above the eyes were the longest, measuring over three foot in length.

Ceratopsids had a very powerful muscle that connected the lower jaw, above the pivot point, to the frill for maximum bite power at the rear teeth. At the front of the jaw was a massive "parrot like" beak. Later species of Ceratopsians had sharp and narrow beaks. Their teeth evolved over generations to be sharper than their ancestors to adapt them to eating new and tougher leaved plants such as palms which contained a nourishing milky sap. New teeth were always growing in to replace older worn out ones.

Ceratopsians traveled in herds for best protection. It is suspected that ceratopsids formed a circle around the young to protect them during an attack. It has been calculated that ceratopsians, despite their size, may have ran as fast as thirty miles an hour. Because of it's size, armor, and ability to charge, ceratopsians were most likely the most dangerous of all plant eating dinosaurs.

To date, fifteen species of Triceratops have been identified. Skeletal remains have been found in Alberta to Colorado, and South Dakota to parts of Saskatchewan.

The following is an example of part of a sample lesson for instructing the student in electricity. The student is introduced to this lesson when the battery 48 and wires 52 are connected on the action model 100:

---

Lesson #1 Basic Electricity

|  |  |
|---|---|
|  | Develop an understanding of the basic principles and theories of electricity. |
| Voltage | Is the measure of the force behind the motion of electrons or electric charge. |
| Current | Is the flow of electrons or electric charge. |
| Resistance | Is the force opposing the flow of current. |
| Ohm's Law | Includes the formulas used to calculate the values for any one of the electrical unknowns (voltage, current, resistance) in a circuit when two of the factors are known. These formulas are: $E = I*R$, $E = E/R$, and $R = E/I$ where $E$ = voltage, $I$ = current, and $R$ = resistance. |

---

The following is an example of part of a sample lesson for instructing the student in mechanics, specifically gear reduction. The lesson's illustrations are not shown:

Gear Reduction Lesson

Above is an example of a spur gear. Around its radius are small teeth which must be the same size as those of the gear it is meshing with. In our example, each spur gear also has a smaller spur gear mounted on its one side. The larger spur gear has 100 teeth and the smaller spur gear only 50 teeth. Both gears being mounted to each other will result in them both turning in the same direction at the same speed.

The arrangement of the gears in the gear system will determine if the speed of the last gear will be faster or slower than the speed of the motor driving the system. We are working with ratios when we are comparing two gear speeds. We can use the number of teeth on each gear to help us determine the speeds the gears are turning in the gear system. The ratio is expressed as:

Drive ratio = # of teeth on driven gear/# of teeth on driver gear

Figure 23A:
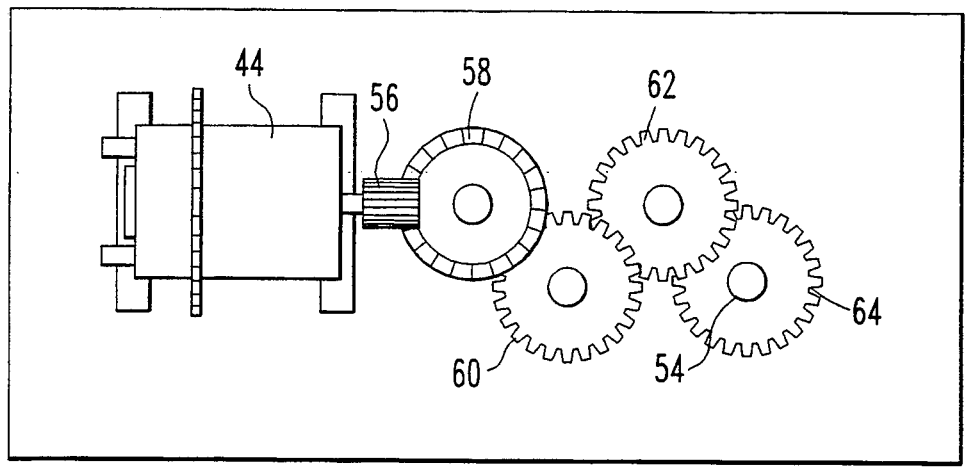
FIGS. 23a and 23b are schematic representations showing the moving means.
Figure 23B:
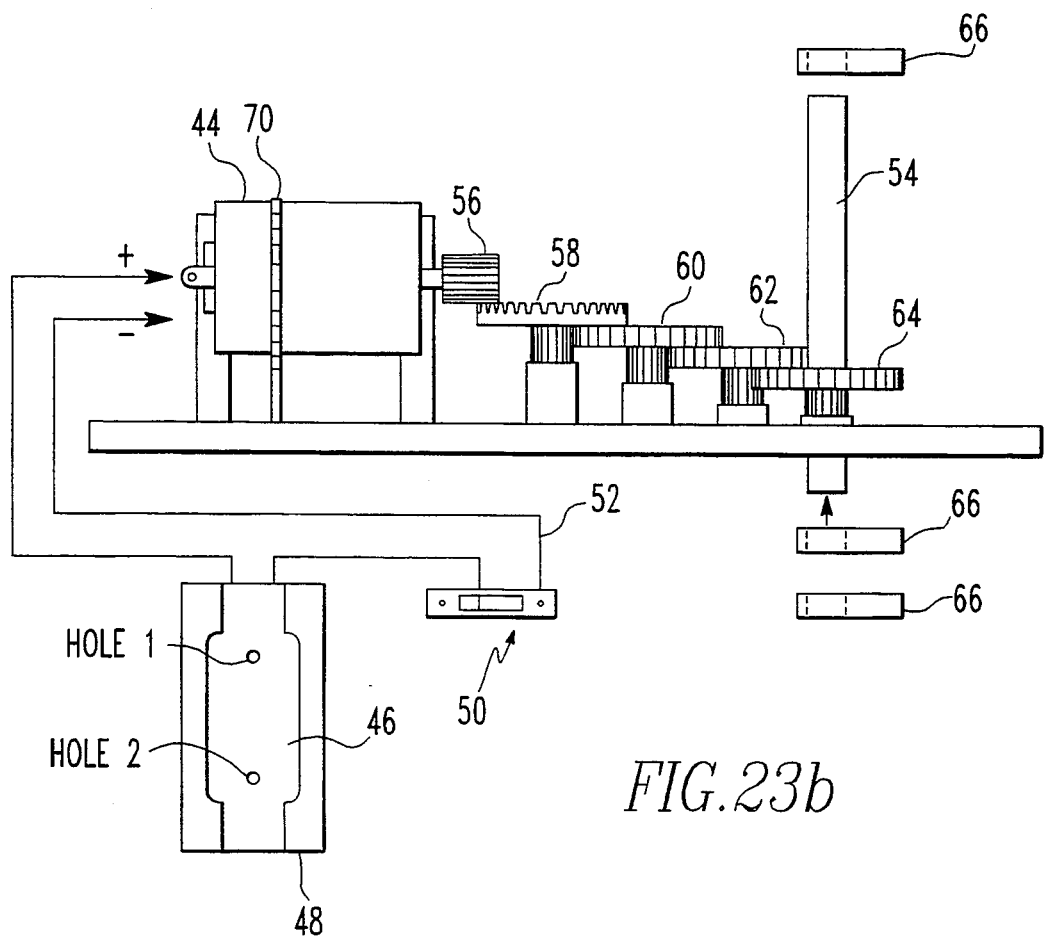
Figure 24A:
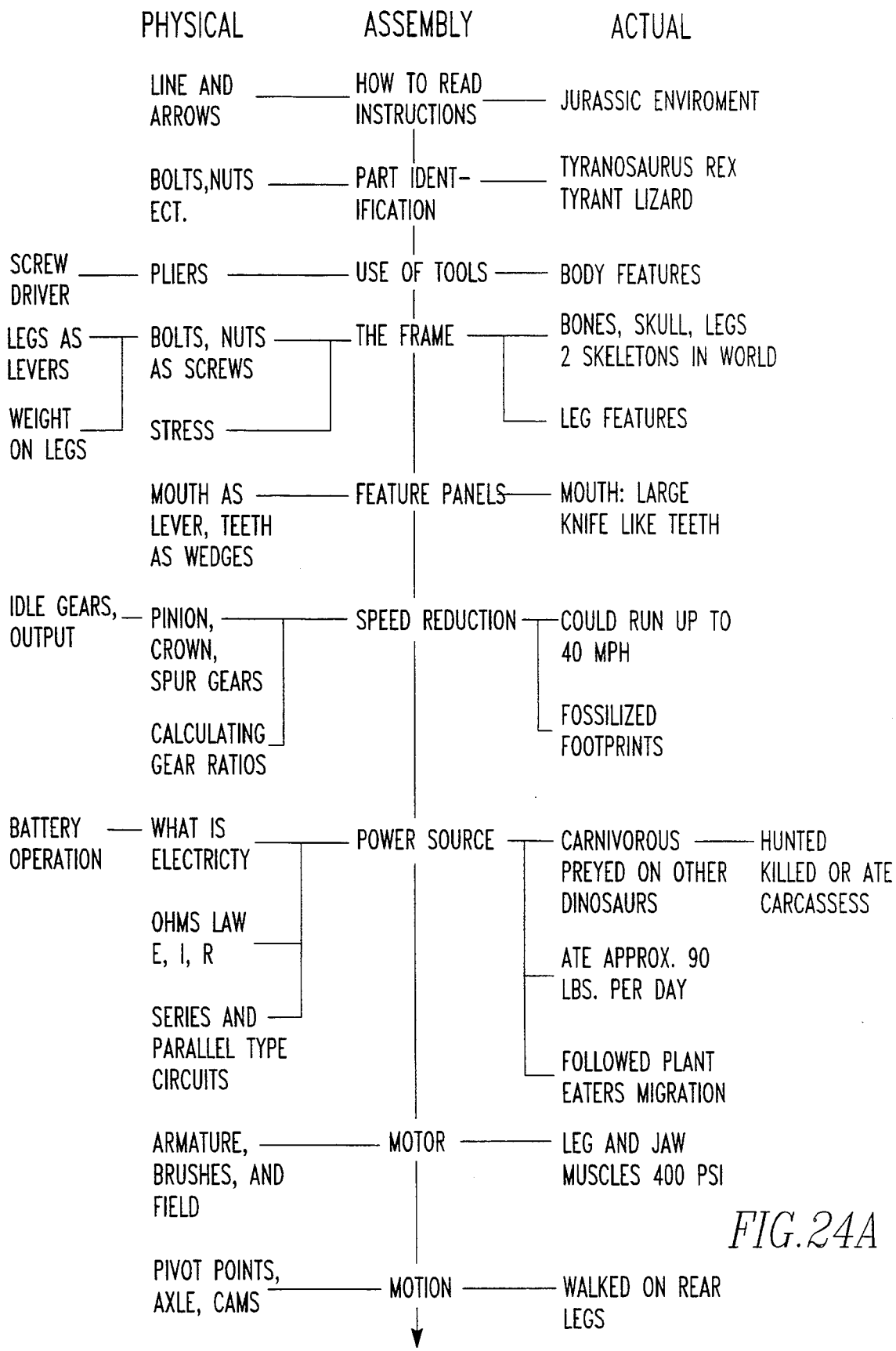
FIGS. 24a and 24b are block diagrams showing a typical lesson plan with respect to the stages of constructing the action model.
Figure 24B:
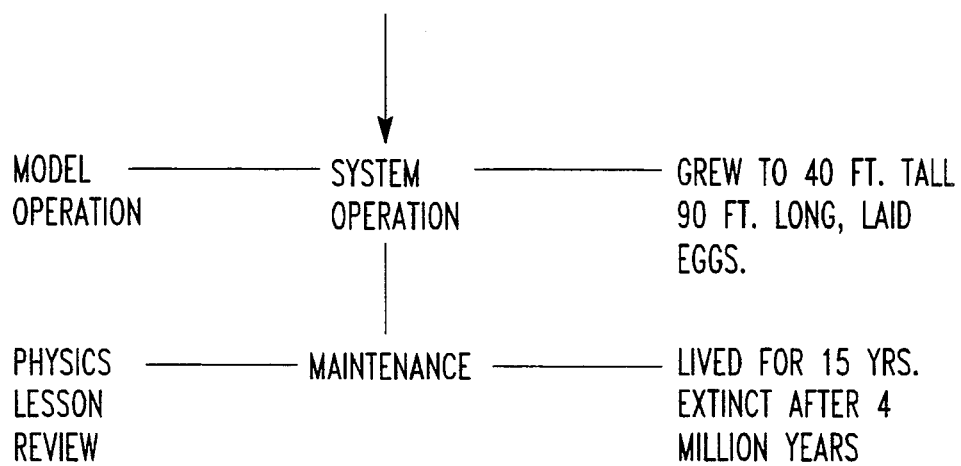

In the operation of the preferred embodiment of the hands-on teaching system, the following is a sample assembly procedure for a Triceratops action model 100. FIG. 23 shows the lessons that the student learns during these assembly steps.

Assembly procedure: Detailed.
Panels are numbered in the order they are used in assembly.
See panel diagram for hole, stand off, boss identification and panel orientation for assembly.
Bolt length is referenced by the number of panels they can go through.
All nuts are applicable to the bolts.
All cams are identical, and referenced by number in order of use.
Pins are referenced by number. There are two types.
STEP 1: Right horn assembly (completed model viewed from front).

PARTS: Inner panel 1, horn panel 2, one bolt 38, and one nut 42.
NOTE: Horn panel 2 and horn panel 4, and inner panel 1 and inner panel 3 are identical.
- a. Position inner panel 1 and horn panel 2 as shown in panel diagram.
- b. Align horn panel 2 hole 1 with inner panel 1 hole 1.
- c. Insert a bolt 38 into horn panel 2 hole 1 and through inner panel 1 hole 1.
- d. Apply and tighten nut 42 onto the 2 bolt 38.

STEP 2: Left horn assembly (completed model viewed from front).
PARTS: Inner panel 3, horn panel 4, one bolt 38, and one nut 42.
- a. Position inner panel 3 and horn panel 4 as shown in panel diagram.
- b. Align horn panel 4 hole 1 with inner panel 3 hole 1.
- c. Insert a bolt 38 into horn panel 4 hole 1 and through inner panel 3 hole 1.
- d. Apply and tighten a nut 42 onto the bolt 38.

STEP 3: Core assembly.
PARTS: Inner panel 1 and horn panel 2 assembly, inner panel 3 and horn panel 4 assembly, center panel 5, mouth panel 6, chest panel 7, one bolt 40, and one nut 42.
- a. Position inner panel 3, center panel 5, mouth panel 6, and chest panel 7 as in panel diagram.
- b. Align center panel 5 holes 1, 2, 3, and 4 with inner panel 3 holes 5, 6, and 7.
- c. Insert stand off on mouth panel 6 into hole 2 of inner panel 3.
- d. Align chest panel 7 holes 2 and 1, with inner panel 3 holes 4 and 3.
- e. Align inner panel 1 holes 5, 6, and 7 with chest panel 5 holes 1, 2, and 3.
  Mouth panel 6 stand off must align with inner panel 1 hole 2.
  Inner panel 1 holes 4 and 3 must align with chest panel 7 holes 2 and 1.
- f. Insert a bolt 40 into inner panel 1 hole 3, through chest panel 7 hole 1, and inner panel 3 hole 3.
- g. Apply and tighten a nut 42 onto the bolt 40.

STEP 4: Brackets and core assembly.
PARTS: Inner panel 1, chest panel 7, inner panel 3, center panel 5, eight brackets 34, four bolts 40, and four nuts 42.
NOTE: All brackets 34 will point in away from inner cavity of model 100 and will have a face flush with the inside edge of inner panel 1 and inner panel 3.
- a. Align the hole of a bracket 34 with inner panel 1 hole 4.
- b. Insert a bolt 40 into the bracket 34, through inner panel 1 hole 4, chest panel 7 hole 2, inner panel 3 hole 4 and into bracket 34.
- c. Apply and tighten a nut 42 onto the bolt 40.
- d. Align the hole of a bracket with inner panel 1 hole 5.
- e. Insert a bolt 40 into the bracket 34, through inner panel 1 hole 5, center panel 5 hole 2, inner panel 3 hole 5, and into bracket 34.
- f. Apply and tighten a 1 nut onto the bolt 40.
- g. Align the hole of a bracket with inner panel 1 hole 6.
- h. Insert a bolt 40 into the bracket 34, through inner panel 1 hole 6, center panel 5 hole 6, inner panel 3 hole 6, and into bracket 34.
- i. Apply and tighten a nut 42 onto the bolt 40.
- j. Align the hole of a bracket with inner panel 1 hole 7.
- k. Insert a bolt 42 into the bracket 34, through inner panel 1 hole 7, center panel 5 hole 3, inner panel 3 hole 7, and into bracket 34.
- l. Apply and tighten a nut 42 onto the bolt 40.

STEP 5: Motor and mechanical drive assembly.
PARTS: Core assembly, one motor 44, one cam, gears 59, and cable tie 70.
NOTE: Cams 1, 2, and 3 are identical.
- a. Position inner panel 3 as shown in panel diagram.
- b. Insert longer side of output shaft 54, with gear 64, into center panel 5 hole 5.
- c. Slide a cam 66 onto output shaft 54 on the side of center panel 5 without gear.
  Stop when cam 66 is 0.125 in. away from center panel 5.
- d. Place a clustered spur gear 62 onto center panel 5 stand off 1.
  Gear 64 should mesh with gear 62.
- e. Place clustered spur gear 60 onto center panel 5 stand off 2.
  Gear 60 should mesh with gear 62.
- f. Place clustered crown gear 58 onto center panel 5 stand off 3.
  Gear 58 should mesh with gear 60.
- g. Place pinion gear 56 with bore vertical on a hard surface.
- h. Align motor shaft with pinion gear 56 bore, and insert by pressing downward on motor 44 until motor shaft is against hard surface.
- i. Place motor 44 in center panel 5 motor cradle so that motor terminals are facing up, and motor shaft points right.
  Pinion gear 56 should mesh with crown gear 58.
- j. Secure motor 44 in center panel 5 motor cradle using cable tie 70 inserted in center panel 5 hole 6, and back through center panel 5 hole 7. Insert the pointed end of the cable tie 70 into the locking end. Pull pointed end through lock until tight. Clip off extra.
  Do not over tighten. Crown gear 58 must be able to spin while pinion gear 56 is meshing.
  If cable 70 does not remain tight, pull pointed end back through cable lock, center panel 5 holes 6 and 7. Flip cable tie 70 over and reinsert. Repeat j.

STEP 6: Mounting the battery case 46 to lower cross panel 8.
PARTS: Lower cross panel 8, one battery case 46, two bolts 36, and two nuts 42.
NOTE: Lower cross panel 8 and upper cross panel 9 are identical.
- a. Position lower cross panel 8 as in panel diagram.
- b. Align holes 1 and 2 on battery case 46 with lower cross panel 8 holes 1 and 2.
  Wires should be on right.
  Wires should be in switch notch.
- c. Insert a bolt 36 into battery case hole 1, through lower cross panel 8 hole 1.
- d. Apply and tighten a nut 42 onto the bolt 36.
- e. Insert a bolt 36 into battery case hole 2, through lower cross panel 8 hole 2.
- f. Apply and tighten a nut 42 onto the bolt 36.

STEP 7: Mounting electrical switch 50 to lower cross panel 8.

PARTS: Lower cross panel 8, one switch 50, two bolts 36, and two nuts 42.
   a. Position lower cross panel 8 as in panel diagram.
   b. Align holes 1 and 2 on switch 50 with lower cross panel 8 hole 3 and lower cross panel 8 hole 4.
      Slide part of switch 50 should face up.
      All wires from battery case 46 must pass through switch notch.
   c. Insert a bolt 36 into switch hole 1, through lower cross panel 8 hole 3.
   d. Apply and tighten a nut 42 onto the bolt 36.
   e. Insert a bolt 36 into switch hole 2, through lower cross panel 8 hole 4.
   f. Apply and tighten a nut 42 onto the bolt 36.

STEP 8: Mounting lower cross panel 8 to core assembly.
PARTS: Lower cross panel 8, core assembly, four bolts 36, and four nuts 42.
   a. Position core assembly as inner panel 3 is in panel diagram.
   b. Insert lower cross panel 8 into lower slot of center panel 5 of core assembly.
      Switch 50 should be on same side of core assembly as motor 44.
      Stop insertion when lower cross panel 8 holes 5, 6, 7, and 8 align with brackets 34 mounted on inner panel 1 holes 7 and 4, and inner panel 3 holes 7 and 4.
   c. Insert a bolt 36 in bracket mounted on inner panel 1 hole 7, and through lower cross panel 8 hole 5.
   d. Apply and tighten a nut 42 onto the bolt 36.
   e. Insert a bolt 36 in bracket 34 mounted on panel 1 hole 4, and through panel 8 hole 6.
   f. Apply and tighten a nut 42 onto the bolt 36.
   h. Insert a bolt 36 in bracket 34 mounted on panel 3 hole 7, and through panel 8 hole 7.
   i. Apply and tighten a nut 42 onto the bolt 36.
   j. Insert a bolt 36 in bracket 34 mounted on panel 3 hole 4, and through panel 8 hole 8.
   k. Apply and tighten a nut 42 onto the bolt 36.

STEP 9: Mounting upper cross panel 9 to core assembly.
NOTE: Upper cross panel holes 1, 2, 3, and 4 are not used.
NOTE: All notches should be in same position on upper cross panel 9 as on lower cross panel 8.
   a. Position upper cross panel 9 as in panel diagram.
   b. Insert upper cross panel 9 into upper slot of panel 5 of core assembly.
      Stop insertion when upper cross panel 9 holes 5, 6, 7, and 8 align with brackets 34 mounted on inner panel 1 holes 6 and 5, and inner panel 3 holes 6 and 5.
   c. Insert a bolt 36 in bracket 34 mounted on inner panel 1 hole 6, and through upper cross panel 9 hole 5.
   d. Apply and tighten a nut 42 onto the bolt 36.
   e. Insert a bolt 36 in bracket 34 mounted on inner panel 1 hole 5, and through upper cross panel 9 hole 6.
   f. Apply and tighten a nut 42 onto the bolt 36.
   h. Insert a bolt 36 in bracket 34 mounted on inner panel 3 hole 6, and through upper cross panel 9 hole 7.
   i. Apply and tighten a nut 42 onto the bolt 36.
   j. Insert a bolt 36 in bracket 34 mounted on panel 3 hole 5, and through panel 9 hole 8.
   k. Apply and tighten a nut 42 onto the bolt 36.

STEP 10: Mouth pivot arm panel 10 and pin 30 insertion into core assembly.
PARTS: Mouth pivot arm panel 10, one pin 30, and core assembly.
NOTE: Sloped end of mouth pivot arm panel 10 must be below cam 66 on output shaft 54.
   a. Position inner panel 1, of core assembly, and mouth pivot arm panel 10 as shown in panel diagram.
   b. Align mouth pivot arm panel 10 hole 1 with boss hole on center panel 5 of core assembly.
      Boss is located on cam 1 side of center panel 5 of core assembly.
   c. Insert a pin 30 through mouth pivot arm panel 10 hole 1 into center panel 5 boss hole.
      Support center panel 5 while inserting pin 30.
      Insert pin 30 into boss until it stops.
      Mouth pivot arm panel 10 should be able to pivot freely on pin 30.

STEP 11: Inserting a pin 30 into mouth panel 6 of core assembly.
PARTS: One pin 30, and mouth panel 6 of core assembly.
NOTE: Rounded end of mouth pivot arm panel 10 must be below pin 30 in mouth panel 6 boss 1.
   a. Position inner panel 1 as shown in panel diagram.
   b. Insert a pin 30 into mouth panel 6 boss 1.
      Support mouth panel 6 while inserting 1 pin.
      Insert a pin 30 into mouth panel 6 boss 1 until it stops.
      Mouth panel 6 should pivot freely when mouth pivot arm panel 10 is lifted.

STEP 12: Motor 44 electrical hook up, and partial system activation.
PARTS: One motor 44, and core assembly.
NOTE: Black wire from switch and red wire from battery case 46 to motor 44.
   a. Position model as inner panel 3 is shown in panel diagram.
   b. Slide connector on red wire onto to top terminal on motor 44.
   c. Slide connector on black wire onto bottom terminal on motor 44.
   d. Insert batteries 48 into battery case 46 mounted on lower cross panel 8.
      Be sure polarity is correct (+ to +, and − to −).
   e. Slide electric switch 50, mounted on lower cross panel 8, to ON position.
      Caution: Switch, mounted on lower cross panel 8, may already be in ON position.
   f. Partial system activation- motor, gear reduction, output shaft 54, cam 1, mouth pivot arm panel 10, and mouth panel 6 movement.
      Core assembly should be held with lower cross panel 8 parallel to floor.
      Motor 44 should turn on and motor output shaft turn clockwise.
      If motor 44 does not turn clockwise, slide electric switch 50, mounted on lower cross panel 8, to OFF position.
      Disconnect red and black wires from electric motor terminals and reverse connections.
      Reconnect red and black wires to electric motor terminals.
      Slide electric switch, mounted on lower cross panel 8, to ON position.
      All gears 59 should turn.

g. Rotate core assembly 180° to observe other side, so that model is positioned as inner panel 1 is shown in panel diagram.
  Cam on output shaft 54 should turn and make contact with mouth pivot arm panel 10.
  Mouth pivot arm panel 10 should pivot on pin 30 through mouth pivot arm panel 10 hole 1 in center panel 5 boss 1.

STEP 12: Motor electrical hook up, and partial system activation; continued
  Each end should move in an up and down motion.
  Should make contact with mouth panel 6.
  Mouth panel 6 should pivot on off sets in inner panel 1 hole 2, and inner panel 3 hole 2.
  Each end of mouth panel 6 should move in an up and down motion.
  h. Turn electric switch 50, mounted on lower cross panel 8, to OFF position.

STEP 13: Mounting brackets 34 for outer panel 11 and outer panel 12, on lower cross panel 8.
PARTS: Four brackets 34, core assembly, four bolts 36, and four nuts 42.
NOTE: All brackets 34 must point in towards core assembly, and face of bracket must be flush with outer edge of lower cross panel 8.
NOTE: All brackets 34 must be mounted on battery case side of lower cross panel 8.
  a. Position inner panel 1, of core assembly, as shown in panel diagram.
  b. Align a hole in a bracket of lower cross panel 8 hole 9.
  c. Insert a bolt 36 into the bracket 34 and through lower cross panel 8 hole 9.
  d. Apply a nut 42 to the bolt 36 and tighten.
  e. Align a hole in a bracket of lower cross panel 8 hole 10.
  f. Insert a bolt 36 into the bracket 34 and through lower cross panel 8 hole 10.
  g. Apply a nut 42 to the bolt 36 and tighten.
  h. Align a hole in a bracket 34 of lower cross panel 8 hole 11.
  i. Insert a bolt 36 into the bracket 34 and through lower cross panel 8 hole 11.
  j. Apply a nut 42 to the bolt 36 and tighten.
  k. Align a hole in a bracket 34 of lower cross panel 8 hole 12.
  i. Insert a bolt 36 into the bracket 34 and through lower cross panel 8 hole 12.
  m. Apply a nut 42 to the bolt 36 and tighten.

STEP 14: Mounting brackets for outer panel 11 and outer panel 12, on upper cross panel 9.
PARTS: Four brackets 34, core assembly, four bolts 36, and four nuts 42.
NOTE: All brackets 34 must point away from core assembly and face of bracket must be flush with outer edge of upper cross panel 9.
NOTE: All brackets 34 must be mounted on top side of upper cross panel 9.
  a. Position inner panel 1, of core assembly, as shown in panel diagram.
  b. Align a hole in a bracket 34 of upper cross panel 9 hole 9.
  c. Insert a bolt 36 into the bracket 34 and through upper cross panel 8 hole 9.
  d. Apply a nut 42 to the bolt 36 and tighten.
  e. Align a hole in a bracket 34 of upper cross panel 9 hole 10.
  f. Insert a bolt 36 into the bracket 34 and through upper cross panel 9 hole 10.
  g. Apply a nut 42 to the bolt 36 and tighten.
  h. Align a hole in a bracket 34 of upper cross panel 9 hole 11.
  i. Insert a bolt 36 into the bracket 34 and through upper cross panel 9 hole 11.
  j. Apply a nut 42 to the bolt 36 and tighten.
  k. Align a hole in a bracket 34 of upper cross panel 9 hole 12.
  l. Insert a bolt 36 into the bracket 34 and through upper cross panel 9 hole 12.
  m. Apply a nut 42 to the bolt 36 and tighten.

STEP 15: Mounting outer panel 11 to lower cross panel 8 and upper cross panel 9 of assembly core.
PARTS: Assembly core, outer panel 11, four bolts 36, and four nuts 42.
NOTE: Output shaft 54 will extend through the slot in outer panel 11.
  a. Position inner panel 1, of core assembly, and outer panel 11 as in panel diagram.
  b. Align outer panel 11 holes 1, 2, 3, and 4 with brackets 34 mounted in lower cross panel 8 holes 11 and 12, and upper cross panel 9 holes 11 and 12.
  c. Insert a bolt 36 into outer panel 11 hole 1, and through bracket 34 mounted in upper cross panel 9 hole 11.
  d. Apply a nut 42 to the bolt 36 and tighten.
  e. Insert a bolt 36 into outer panel 11 hole 2, and through bracket 34 mounted in upper cross panel 9 hole 12.
  f. Apply a nut 42 to the bolt 36 and tighten.
  g. Insert a bolt 36 into outer panel 11 hole 3, and through bracket 34 mounted in upper cross panel 9 hole 12.
  h. Apply a nut 42 to the bolt 36 and tighten.
  i. Insert a bolt 36 into outer panel 11 hole 4, and through bracket 34 mounted in upper cross panel 9 hole 11.
  j. Apply a nut 42 to the bolt 36 and tighten.

STEP 16: Mounting outer panel 12 to lower cross panel 8 and upper cross panel 9.
PARTS: Assembly core, outer panel 12, four bolts 36, and four nuts 42.
NOTE: Output shaft 54 will extend through the slot in outer panel 12.
  a. Position panel 3, of core assembly, and outer panel 12 as in panel diagram.
  b. Align outer panel 12 holes 1, 2, 3, and 4 with brackets 34 mounted in lower cross panel 8 holes 9 and 10, and upper cross panel 9 holes 9 and 10.
  c. Insert a bolt 36 into outer panel 12 hole 1, and through bracket 34 mounted in upper cross panel 9 hole 9.
  d. Apply a nut 42 to the bolt 36 and tighten.
  e. Insert a bolt 36 into outer panel 12 hole 2, and through bracket 34 mounted in upper cross panel 9 hole 10.
  f. Apply a nut 42 to the bolt 36 and tighten.
  g. Insert a bolt 36 into outer panel 12 hole 3, and through bracket 34 mounted in upper cross panel 9 hole 10.
  h. Apply a nut 42 to the bolt 36 and tighten.
  i. Insert a bolt 36 into outer panel 12 hole 4, and through bracket 34 mounted in upper cross panel 9 hole 9.
  j. Apply a nut 42 to the bolt 36 and tighten.

STEP 17: Mounting brackets on outer panel 11, and outer panel 12 for had panel 13.
PARTS: Core assembly, four brackets 34, four bolts 36, and four nuts 42.
NOTE: All brackets 34 must face away from core assembly and face of bracket must be flush with outer edge of outer panel 12 and outer panel 11.
NOTE: All brackets 34 must be mounted on inside of outer panel 12, and outer panel 11.
 a. Position outer panel 12, of core assembly, as in panel diagram.
 b. Align a bracket hole with outer panel 12 hole 5.
 c. Insert a bolt 36 into outer panel 12 hole 5, and through the bracket 34.
 d. Apply a nut 42 to the bolt 36 and tighten.
 e. Align a bracket hole with outer panel 12 hole 6.
 f. Insert a bolt 36 into outer panel 12 hole 6, and through the bracket 34.
 g. Apply a nut 42 to the bolt 36 and tighten.
 h. Align a bracket hole with outer panel 11 hole 5.
 i. Insert a bolt 36 into outer panel 11 hole 5, and through the bracket 34.
 j. Apply a nut 42 to the bolt 36 and tighten.
 k. Align a bracket hole with outer panel 11 hole 6.
 l. Insert a bolt 36 into outer panel 11 hole 6, and through the bracket 34.
 m. Apply a nut 42 to the bolt 36 and tighten.
STEP 18: Mounting head panel 13 to the outer panel 11 and outer panel 12.
PARTS: Core assembly, head panel 13, four bolts 36, and four nuts 42.
NOTE: Head panel 13 is symmetrical, and has no front or back
 a. Insert horn panel 2, and horn panel 4 into notchs in head panel 13.
 b. Insert inner panel 1, inner panel 3, and center panel 5, of core assembly, into the large slot of head panel 13.
 c. Align head panel 13 holes 1, 2, 3, and 4 with brackets 34 mounted on outer panel 11 holes 5 and 6, and outer panel 12 holes 5 and 6.
 d. Insert a bolt 36 into head panel 13 hole 1 and through bracket 34 mounted on outer panel 11 hole 5.
 e. Apply a nut 42 to bolt 36 and tighten.
 f. Insert a bolt 36 into panel 13 hole 2 and through bracket mounted on panel 11 hole 6.
 g. Apply a nut 42 to bolt 36 and tighten.
 h. Insert a bolt 36 into head panel 13 hole 3 and through bracket 34 mounted on outer panel 12 hole 5.
 i. Apply a nut 42 to bolt 36 and tighten.
 j. Insert a bolt 36 into head panel 13 hole 4, and through bracket 34 mounted on outer panel 12 hole 6.
 k. Apply a nut 42 to bolt 36 and tighten.
Step 19: Mounting nose panel 14.
 a. Position panel 1 of core assembly, and nose panel 14 as in panel diagram.
 b. Slide nose panel 14 in btween inner panel 1 and inner panel 3.
 c. Align nose panel 14 holes 1 and 2 with inner panel 1 holes 8 and 9, and inner panel 3 holes 8 and 9.
 d. Insert a bolt 44 into inner panel 1 hole 8, through nose panel 14 hole 1, and through inner panel 3 hole 8.
 e. Apply a nut 42 to bolt 44 and tighten.
 f. Insert a bolt 44 into inner panel 1 hole 9, through nose panel 14 hole 2, and through inner panel 3 hole 9.
 g. Apply a nut 42 to bolt 44 and tighten.
STEP 20: Mounting eyes 68, to inner panel 1 and inner panel 3.
PARTS: Core assembly, eye 1, and eye 2.
NOTE: First eye 68 and second eye 68 are identical.
NOTE: Eyes are held in by friction fit.
 a. Position inner panel 11, of core assembly, as shown in panel diagram.
 b. Insert shaft of a first eye 68 into inner panel 1 hole 10.
  Stop insertion when shaft of eye piece will go in no further.
 c. Insert shaft of a second eye 68 into inner panel 3 hole 10.
  Stop insertion when shaft of eye piece will go in no further.
STEP 21: Second cam 66, third cam 66, and front leg assembly drive.
PARTS: Two pins 32, second cam 66, third cam 66, and core assembly.
NOTE: Cams 2 and 3 are identical.
 a. Hold a pin 32 vertically against a hard flat surface.
 b. Align hole 2 of second cam 68 with pin 32.
 c. Press second cam 68 onto pin 32 until pin 32 is all the way through second cam 68 hole 1, and pin 32 is flush with second cam's 68 outer surface.
  Pin 32 in second cam 68 hole 1 is friction fit and must not spin.
 d. Position model as outer panel 1, of core assembly, is shown in panel diagram.
 e. Place model horizontally, on it's side, on flat hard surface.
 f. Align second cam 68 hole 2 with output shaft 54.
  Pin 32 in second cam 68 hole 1 pointing away from core assembly.
 g. Press second cam 68 onto output shaft 54 until the shaft is all the way through second cam 68 and output shaft 54 is flush with second cam's 68 outer surface.
  Second cam 68 is friction fit onto the output shaft 54 and must not spin.
 h. Hold a pin 32 vertically against a hard flat surface.
 i. Align hole 2 of third cam 68 with pin 32.
 j. Press third cam 68 onto pin 32 until pin 32 is all the way through third cam 68 hole 1, and pin 32 is flush with the third cam's 68 outer surface.
  Pin 32 in second cam's 68 hole 1 is friction fit and must not spin.
 k. Turn model over onto it's other side.
 l. Position model as outer panel 3, of core assembly, is shown in panel diagram.
 m. Place model horizontally, on it's side, on flat hard surface.
 n. Align third cam 68 hole 2 with output shaft 54.
  Pin 32 in third cam 68 hole 1 pointing away from core assembly.
  Position pin 32 in third cam 68 hole 1, 180° out of phase with pin 32 in second cam 68 hole 1.
 o. Press-third cam 68 onto output shaft 54 until the shaft 54 is all the way through third cam 68 hole 2 and output shaft 54 is flush with third cam's 68 hole 1 outer surface.
  Third cam 68 is friction fit onto the output shaft 54 and must not spin.

STEP 22: Mounting the front leg to core assembly. Left side of model.
PARTS: Core assembly, connector panel 18, front leg panel 19, and two pins 30.
NOTE: Connector panel 15 and connector panel 18 are identical and symmetrical.
 a. Position connector panel 18, and front leg panel 19, and outer panel 12, of core assembly, as shown in panel diagram.
 b. Place front leg panel 19, with bosses facing up, on a hard surface.
 c. Align connector panel 18 hole 1 with boss 1 in front leg panel 19.
 d. Insert a pin 30 through hole 1 connector panel 18 and into boss 1 of front leg panel 19.
  Stop insertion when pin 30 will go in no further into front leg panel 19 boss 1.
 e. Insert pin 32 in third cam 68 hole 2 through connector panel 18 hole 2.
 f. Insert a pin 32 through outer panel 12 hole 7 from the inside pointing away from assembly core.
  Stop insertion when had of pin 30 is against the inside surface of outer panel 12.
 g. Align front leg panel 19 hole 2 with pin 30 in outer panel 12 hole 7.
 h. Insert pin 30 into front leg panel 19 boss 2.
  Support pin 30 from inside of model.
  Stop insertion when pin 30 will go in no further.
  Pin 30 is friction fit into front leg panel 19 boss 2.
  The pin 30 in front leg panel 19 must b able to spin within outer panel 12 hole 7.
STEP 23: Mounting the front leg to core assembly. Right side of model.
PARTS: Core assembly, connector panel 15, front leg panel 16, and two pins 30.
NOTE: Connector panel 15 and connector panel 18 are identical and symmetrical.
 a. Position connector panel 15, and front leg panel 16, and outer panel 11, of core assembly, as shown in panel diagram.
 b. Place front leg panel 16, with bosses facing up, on a hard flat surface.
 c. Align connector panel 15 hole 1 with boss 1 in front leg panel 16.
 d. Insert a pin 32 through hole 1 connector panel 15 and into boss 1 of front leg panel 16.
  Stop insertion when pin 30 will go in no further into front leg panel 16 boss 1.
 e. Insert a pin 30 in cam 2 hole 2 through connector panel 15 hole 2.
 f. Insert a pin 30 through outer panel 11 hole 7 from the inside pointing away from assembly core.
  Stop insertion when had of pin 30 is against the inside surface of outer panel 16.
 g. Align front leg panel 16 boss 2 with pin 30.
 h. Insert pin 30 into front leg panel 16 boss 2.
  Support pin 30 from inside of model.
  Stop insertion when pin 30 will go in no further.
  Pin 30 is friction fit into front leg panel 16 boss 2.
  The pin 30 in front leg panel 16 must be able to spin within outer panel 11 hole 7.
STEP 24: Rear leg assembly. Right side.
PARTS: Core assembly, rear leg panel 17, and one pin 30.
 a. Position outer panel 11 of core assembly, and rear leg panel 17 as show in panel diagram.
 b. Slide pin 32 in second cam 68 hole 2 into rear leg panel 17 boss 1.
  Rear leg panel 17 must be able to spin on 2 pin in second cam 68 hole 2.
 c. Slide a pin 30 from the inside of outer panel 11, above upper cross panel 9, through the slot in outer panel 11.
 d. Align pin 30, through slot in outer panel 11, with rear leg panel 17 boss 2.
 e. Insert pin 30, through slot in outer panel 11, into rear leg panel 17.
  Support rear leg panel 17 while inserting pin 30.
  Stop insertion when pin 30, through slot in outer panel 11, will go into rear leg panel 17 boss 2 no further.
STEP 25: Rear leg assembly. Left side.
PARTS: Core assembly, rear leg panel 20, and one pin 30.
 a. Position outer panel 12 of core assembly, and rear leg panel 20 as shown in panel diagram.
 b. Slide pin 32 in second cam 68 hole 2 to into rear leg panel 20 boss 1.
  Rear leg panel 20 must be able to spin on pin 32 in second cam 68 hole 2.
 c. Slide a pin 30 from the inside of outer panel 12, above upper cross panel 9, through the slot in outer panel 12.
 d. Align pin 30, through slot in outer panel 12, with rear leg panel 20 boss 2.
 e. Insert pin 30, through slot in outer panel 12, into rear leg panel 20.
  Support rear leg panel 20 while inserting pin 30.
  Stop insertion when pin 30, through slot in outer panel 12, will go into rear leg panel 20 boss 2 no further.
STEP 26: Complete system activation.
NOTE: Model should open and close mouth, and walk forward.
 a. Turn electric switch 50, mounted on lower cross panel 8, to ON position.
  Mouth should open and close.
  All four legs should move.
 b. Place completed model, battery case 46 mounted on lower cross panel 8 facing down, on a hard flat surface.
  Model should open and close it's mouth as it walks.
 c. Turn electric switch 50, mounted on lower cross panel 8, OFF to stop motion.
STEP 27: Maintenance.
PARTS: Bolts, nuts, and batteries.
 a. Over time check model for loose components such as bolts and nuts.
  Tighten bolts and nuts as needed.
 b. Replace batteries 48 as needed.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A hands-on learning system for a student comprising:
 a model kit having a plurality of parts which when assembled form a three-dimensional mechanized action model, said model representing an animal and comprising:
 a plurality of flat rigid molded panels, said panels having distinct shapes which resemble the contour of the animal when assembled, each of said panels having a plurality of irregularly spaced openings for assembly;

a plurality of hardware elements for connecting the panels at parallel or at right angles to each other such that a structural skeleton of the model is exclusively formed form the panels;

means for moving some panels of the model relative to other panels of the model;

means for instructing the student in mechanics with respect to the parts of the model kit;

means for instructing the student in electricity with respect to the parts of the model kit;

means for instructing the student on a subject comprising means for instructing the student on biological facts related to the animal;

means for instructing the student in applied math skills relating to the parts of the model kit; and an overhead projection system.

* * * * *